(12) United States Patent
Herh (10) Patent No.: US 6,714,535 B1
(45) Date of Patent: Mar. 30, 2004

(54) METHOD AND SYSTEM FOR UNLIMITED USE OF TELEPHONY SERVICES OVER A DATA NETWORK WITHOUT INCURRING LONG DISTANCE CALLING TOLLS

(75) Inventor: Ting Herh, Cupertino, CA (US)

(73) Assignees: Broadmedia, Inc., Sunnyvale, CA (US); C-Com Corporation, Hsinchu (TW)

( * ) Notice: Subject to any disclaimer, the term of this patent is extended or adjusted under 35 U.S.C. 154(b) by 0 days.

(21) Appl. No.: 09/435,412

(22) Filed: Nov. 8, 1999

(51) Int. Cl.⁷ .............................................. H04L 12/66
(52) U.S. Cl. .................. 370/352; 370/400; 379/114.03
(58) Field of Search ................................ 370/235, 400, 370/401, 352–356, 338; 379/141.01, 141.06, 114.01, 114.02, 114.03, 114.17, 114.28, 115.02

(56) References Cited

U.S. PATENT DOCUMENTS 6,366,576 B1 * 4/2002 Haga ........................... 514/21
6,370,120 B1 * 4/2002 Hardy ......................... 370/252
6,426,942 B1 * 7/2002 Sienel et al. ................. 370/235
6,445,694 B1 * 9/2002 Swartz ........................ 370/352

* cited by examiner

*Primary Examiner*—Frank Duong
*Assistant Examiner*—Melanie Jagannathan
(74) *Attorney, Agent, or Firm*—Joe Zhang; C. P. Chang; Pacific Law Group, LLP (57) ABSTRACT

A method and system for providing telephony services over a data network is disclosed. According to one embodiment, a service provider enters a service plan with a user. The service plan ensures the user a fixed cost for a substantial long period regardless how long the telephony service is used by the user. Further the service plan requires no purchase of any equipment nor regulates the use of the services in terms of time or distance. The service plan is incorporated in a gatekeeper that is coupled to the data network and administrates all connections over the data network.

22 Claims, 6 Drawing Sheets

| Callee Number | Source Gateway phone | Destination Gateway phone | Start | End | Total (sec) |
|---|---|---|---|---|---|
| 886222227343 | 4085301637 | 88635630851 | Thu Sep 23 08:08:14 1999 | Thu Sep 23 08:12:38 1999 | 264 |
| 86211234586 | 40873329865 | 86211234509 | Thu Sep 23 08:06:54 1999 | Thu Sep 23 08:07:43 1999 | 49 |
| | | | ... | | |

METHOD AND SYSTEM FOR UNLIMITED USE OF TELEPHONY SERVICES OVER A DATA NETWORK WITHOUT INCURRING LONG DISTANCE CALLING TOLLS

BACKGROUND OF THE INVENTION

1. Field of the Invention

The present invention is related to the area of Internet Protocol (IP) telephony and more particularly related to a method and system for providing telephony services between two calling parties over a data network without regulating the use of the services by offering a pair of gateway phones as a rendezvous to the data network.

2. Description of the Related Art

The Internet is a data communication network of interconnected computers and computer networks around the world and is rapidly evolving to the point where it combines elements of telecommunications, computing, broadcasting, publishing, commerce, and information services into a revolutionary new model for global communications. Unlike a circuit-switched network, the Internet is a packet-switched network; communication on the Internet is accomplished by sending small packets of "data" back and forth. In addition to the data itself, each packet contains an address to ensure that it is routed to the correct destination. The exact format of these packets is defined by the Internet Protocol (IP). The "data", of course, can be just about anything, including digitized and encoded "voice." Thus, "Voice Over IP" or VoIP is exactly what is means, voice delivered using the Internet Protocol, for managing the delivery of voice information using the Internet Protocol and sent over the Internet to facilitate telephone-like communications.

Voice, fax, and other forms of information have traditionally been carried over dedicated circuit-switched connections of the public switched telephone network (PSTN) that is typically controlled by one or more phone service carriers, such as Pacific Bell and AT&T. The use of the PSTN is measured in terms of seconds or minutes and times as well as the distance that collectively determine the overall cost of the use. As many businesses are growing in many different geographic locations including overseas, the cost of phone bills goes up drastically, worse when it comes together with the "standard" charges in the business hours. There is thus a great need for ways that many businesses can use to control the cost of the phone bills while the organizations keep growing geographically.

Using the Internet, calls travel as packets of data on shared lines (i.e. the Internet), avoiding the tolls of the PSTN. Currently, unlike the traditional phone service, IP telephony service is relatively unregulated by government. In the United States, the Federal Communications Commission (FCC) regulates phone-to-phone connections over the PSTN, but says they do not plan at least for now to regulate connections between phone users over a shared public data network.

There thus creates a great opportunity for non-phone businesses to get into this multibillion-dollar phone service market in direct competition against the local and long-distance phone companies. For example, Deltathree.com, Inc. offers PC-to-phone, unified messaging, global access calling cards and etc. Microsoft Corporation offers windows-based technologies that enable PC-to-phone and phone-to-phone services. Cisco Systems, Inc. offers certain equipment to facilitate the telephony services over the Internet.

The telephony services over the Internet are indeed more cost-effective than the same services over PSTN. With the advent of new technologies for the Internet, the quality of service (QoS) of the telephony services is catching up quickly. The idea of voice and data over single network is now becoming a reality. Nevertheless, many of the IP telephony service providers carry on the traditional service plans, namely the overall cost of the telephony services is determined by the usage of the network except the charging rate is now significantly lower. From a user perspective, the user still pays for what he/she uses in terms of minutes. Another service plan commonly used among the VoIP businesses is by selling equipment, either software or hardware. In other words, a user must come up with a large sum of financial resources to buy the equipment in order to take advantage of possible free telephony services over a public network.

Despite of many service plans, growing enterprises or even consumers desire for plans that not only offer a possible mechanism to use the telephony services over a public data network without incurring long distance tolls but also are manageable at beginning. Until such plans become available, the public data network would not be utilized at its best and the growing enterprises and the consumers would not be entirely benefited from the available communication resources.

SUMMARY OF THE INVENTION

The present invention has been made in consideration of the above described problems and needs. It can be appreciated by those skilled in the art that the present invention, significantly apart from the prior art systems or service plans, introduces a service solution or model, that provides users an unlimited use of the telephony services for a fixed amount of fees regardless how long the services are used. Further the present invention does not require users to acquire any equipment in order to benefit from the services. It is believed for the first time in the VoIP industry, the present invention provides a service model that truly differentiates from the traditional billing-by-time model or the purchasing equipment model and offers a profound opportunity to populate the VoIP services among consumers and businesses.

According to one aspect of the present invention, a method for providing a telephony service through a data network to an entity that has a first location and a second location, the two locations remotely located with respect to each other and each having a number of telephonic devices, the method comprising:

entering a service plan with the entity, the service plan including a periodic payment from the entity, wherein the periodic payment stays unchanged for a substantial long period;

providing a first group of gateway phones installed closely enough to the first location, each of the first group of gateway phones assigned to a first number and coupled between the data network and a first telephone network so that any of the telephonic devices of the first location just needs to make a local call to be connected to one of the first group of gateway phones;

providing a second group of gateway phones installed closely enough to the second location, each of the second group of gateway phones assigned to a second number and coupled between the data network and a second telephone network so that any of the telephonic devices of the second location just needs to make a local call to be connected to one of the second group of gateway phones;

provisioning the entity by storing the first number of each of the first group of gateway phones and the second number of each of the second group of gateway phones in a gatekeeper server coupled to the data network;

establishing a connectionless link over the data network between one of the first group of gateway phones and one of the second group of gateway phones upon receiving a calling request from the one of the first group of gateway phones, the calling request being generated therein when one of the telephonic devices of the first location dials the first number of the one of the first group of gateway phones, the calling request including the first number of the one of the first group of gateway phones and a phone number of the one of the telephonic devices of the second location; and wherein one of the second group of gateway phones automatically dials the phone number of the one of the telephonic devices of the second location so that the telephony service can be provided between the one of the telephonic devices of the first location and the one of the telephonic devices of the second location.

Accordingly, one of the objects in the present invention is to provide a new service solution to allow consumers and businesses alike to fully benefit from the widely accessible communication infrastructure, the Internet.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

In the following detailed description of the present invention, numerous specific details are set forth in order to provide a through understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention. The detailed description is presented largely in terms of procedures, steps, logic blocks, processing, and other symbolic representations that directly or indirectly resemble the operations of data processing devices coupled to networks. These process descriptions and representations are the means used by those experienced or skilled in the art to most effectively convey the substance of their work to others skilled in the art. The method along with the system to be described in detail below is a self-consistent sequence of processes leading to one or more desired results. It proves convenient at times, principally for reasons of common usage, to refer to data as messages, requests, values, elements, symbols, terms, numbers, or the like. It should be borne in mind that all of these similar terms are to be associated with the appropriate physical quantities and are merely convenient labels applied to these quantities.

Figure 1A:
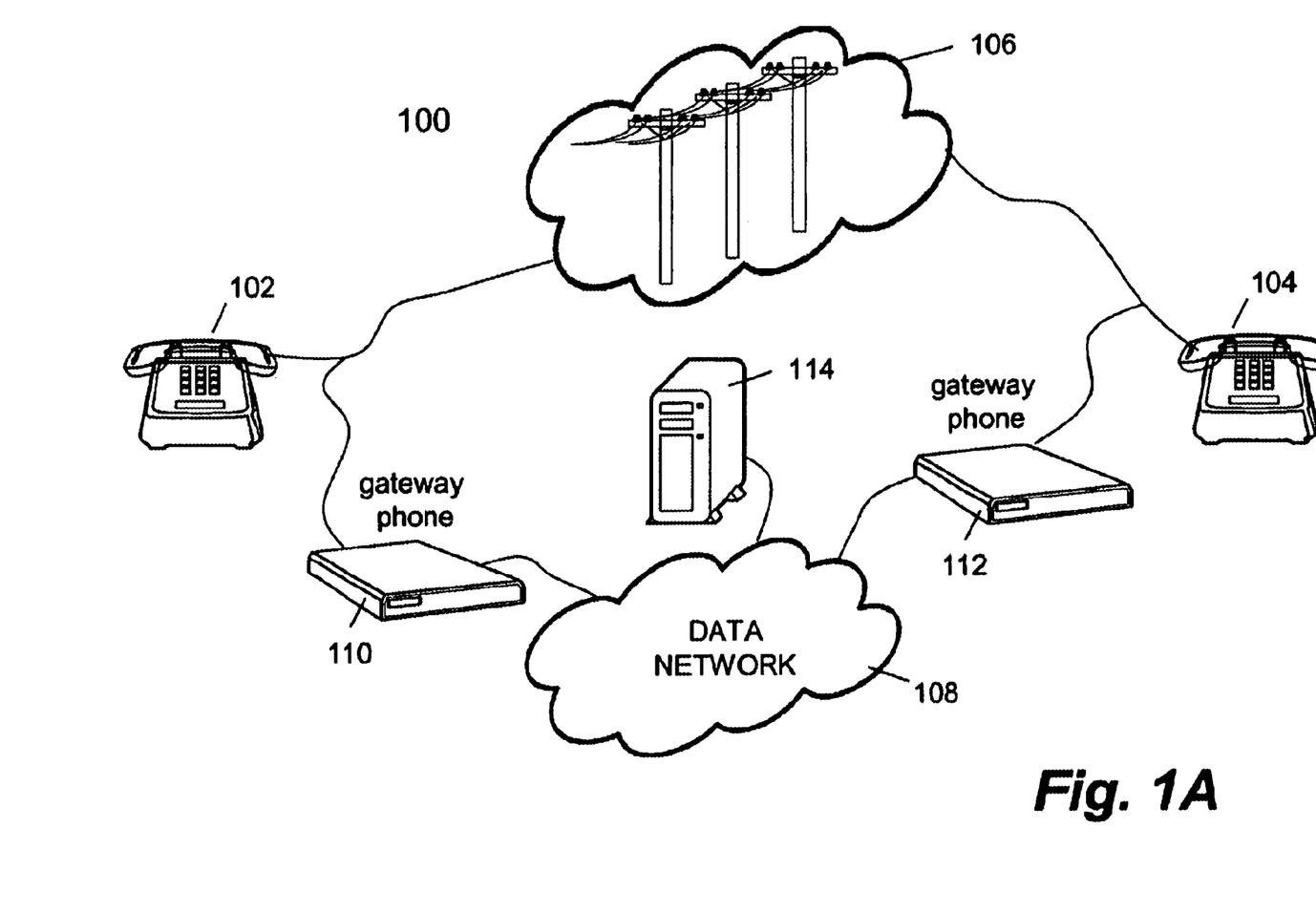
FIG. 1A shows a system configuration in which the present invention may be practiced.

Referring now to the drawings, in which like numerals refer to like parts throughout the several views. FIG. 1A shows a system configuration 100 in which the present invention may be practiced. A pair of telephone sets (or simply phone) 102 and 104 are coupled to a public switched telephone network (PSTN) 106. Phones 102 and 104, that may include a wireless telephone and a facsimile machines, are typically remotely located with respect to each other, for example, phone 102 is sited in a city of California in USA and phone 104 is sited in a city of Japan. Generally, PSTN 106 comprising local, long distance and international long distance phone networks is controlled by one or more carriers such as Pacific Bell and AT&T. When phone 102 is in voice communication with phone 104 over PSTN 106, each of the carriers whose networks are involved will impose a charge for the use of its network. The calling party is then collectively billed for the communication service provided over PSTN 106 typically in terms of minutes, distance and when the service is provided in a day.

Data network 108 is primarily for transporting data and being explored to provide voice communications thereon. Data network 108 may be the Internet, the Intranet and a network of private and public networks, connecting computers directly or indirectly together around the world. According to one particular configuration in which data network 108 is the Internet, enterprises or businesses deploy Local Area Networks (LANs) to couple their internal computers or other computing devices to the Internet. Essentially all enterprises can be connected through the Internet.

Referenced by 110 and 112 is a pair of gateway phones that have both phone capabilities and data network capabilities. As the name suggests, a gateway phone is a combination of a phone and a data processing unit with an interface to a data network, the detailed description thereof will be provided below. Preferably, gateway phone 110 is installed geographically closely enough to phone 102 such that a call to/from phone 102 from/to gateway phone 110 is just a local call, incurring no or very little PSTN local tolls. Likewise, gateway phone 112is installed geographically closely enough to phone 104 such that a call to/from phone 104 from/to gateway phone 112 is just a local call, incurring no or very little PSTN local tolls.

As both of gateway phones 110 and 112 are coupled to a date network 108, a packet-switched connection or a connectionless link can be established between gateway phones 110 and 112. Together with the local circuit-switched connections between phone 102 and gateway phones 110 as well as phone 104 and gateway phones 112, a final voice communication link can be provided by a server device 114 between phones 102 and 104. Server device 114, also referred to as a gatekeeper herein and coupled to data network 108, provides necessary communication management functions including gateway phone management and authentication, user administration and authorization, usage reports, messaging services and others. The detailed description of the gatekeeper will be provided below.

As illustrated in FIG. 1A, the voice communication link between phones 102 and 104 over data network 108 is unregulated when data network 108 is the Internet, namely no one is supposed to be there to monitor the use of the network. In other words, anyone can transport any data from anywhere to any destination. From a communication perspective, a communication infrastructure capable of reaching anywhere in the world is already in existence and better, no one could claim an ownership of it.

Figure 1B:
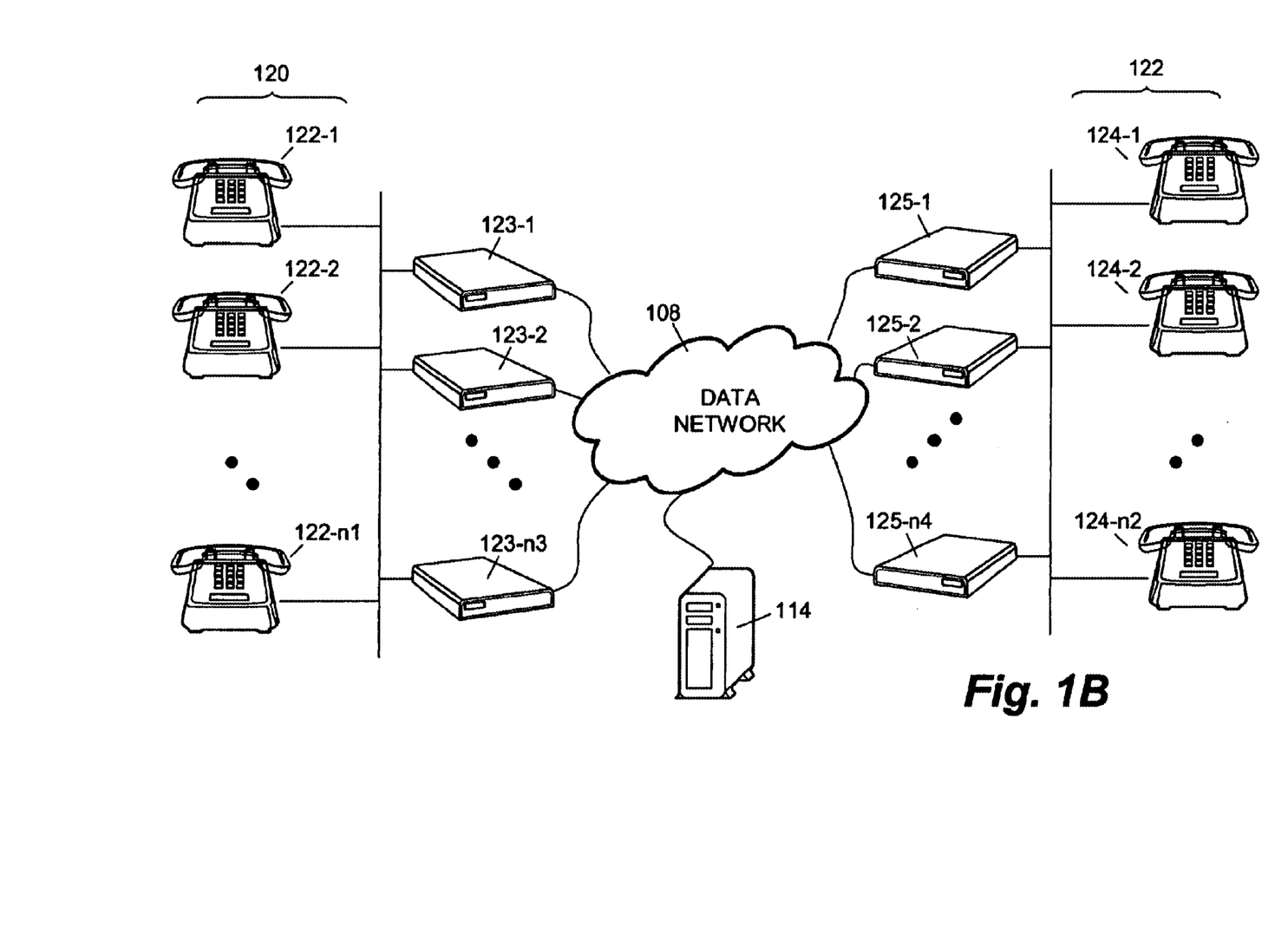
FIG. 1B shows a more generic system configuration in which the present invention may be practiced.

FIG. 1B illustrates another system configuration in which the present invention may be practiced. One of the differences between FIG. 1A and FIG. 1B is that each calling party at location A 120 and location B 122 has a number of phones 122 and 124. This is a typical setting for two locations within an enterprise. For example, a company has a first office in location A 120 and a second office in location B 122, each location has n1 or n2 number of phones. Calling each other in business hours over the traditional PSTN can incur numerous long distance or international long distance tolls. With an installation of a number of gateway phones 123 or 125 on each site as shown in the figure, the PSTN tolls can be avoided by using data work 108 to conduct the voice communication between one of the phones in party A and one of the phones in party B. By installing a number of gateway phones n3 or n4 on each site, a number of communications may be conducted simultaneously. It should be noted that n1, n2, n3 and n4 are not necessarily identical. According to one aspect of the present invention, gatekeeper 114 administrates the connectionless link between each pair of the gateway phones as will be explained more detail below.

Figure 2A:
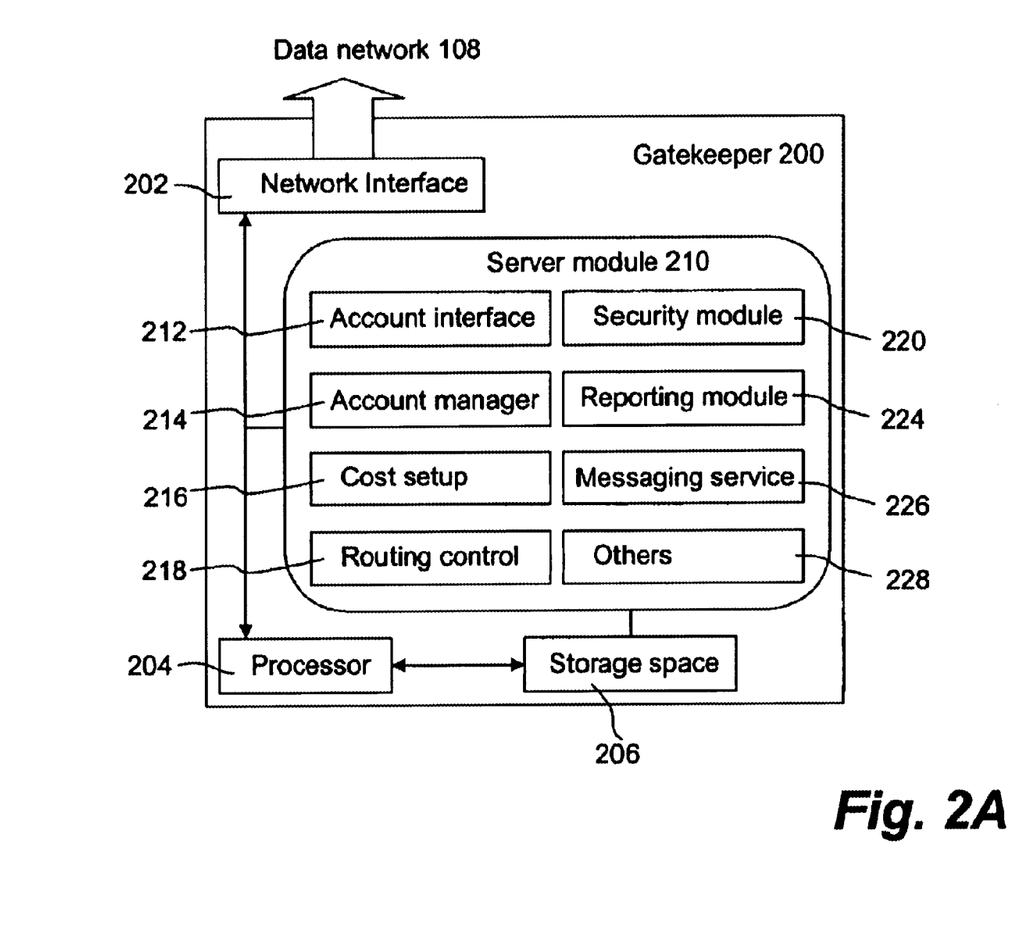
FIG. 2A shows a function block diagram of a gatekeeper that is generally controlled or managed by an IP telephony service provider.

Referring now to FIG. 2A, there is shown a function block diagram of a gatekeeper 200 that may correspond to gatekeeper 114 of FIG. 1A or 1B and is generally controlled or managed by an IP telephony service provider. Network interface 202 in gatekeeper 200 facilitates a data flow between data network 108 and gatekeeper 200 and typically executes special set of rules (a protocol) for the end points in a link to send data back and forth. One of the common protocols is TCP/IP (Transmission Control Protocol/Internet Protocol) commonly used in the Internet. Network interface 202 manages the assembling of a message or file into smaller packets that are transmitted over data network 108 and reassembles received packets into the original message or file. In addition, it handles the address part of each packet so that it gets to the right destination.

Further gatekeeper 200 comprises a processor 204, a storage space and a server module 210. In practice, any computing device having reasonable computing resources (i.e. processor power and memory capacity) may be implemented as a gatekeeper. According to one embodiment of the present invention, server module 210 is a compiled and linked version of a computer language implementing the embodiment and loaded in a memory, such as storage space 206. When executed by processor 204, server module 210 performs a number of functions to facilitate the operations of the present invention.

As shown in the figure, server module 210 comprises an account interface 212, an account manager 214, a cost setup module 216, a routing control 218, a security module 220, a reporting module 224, a messaging service 226 and other modules 228 that may be added on if needed. Account interface 212 provides account manager 214 an access to a user database that includes a plurality of user accounts associated with users who have signed up for the IP telephony services provided over the data network. The user database may be located within gatekeeper 200 (i.e. storage space 206) or in another server (not shown) coupled to the data network. The user database may include various relationships including service plans between the users and the service provider.

According to one aspect of the present invention, a user who decides to use the IP telephony services provided by the service provider enters an agreement with the service provider. The agreement may include a monthly payment with unlimited use of the telephony services provided by the service provider. The monthly payment may stay unchanged for a certain period, for example, one or two years. After that, a small increase may be adjusted to accouter for the inflation. With the agreement in force, account manager 214 keeps the user account active in receiving the services. Cost setup module 216 preferably works with account manager 214 to provide different levels or kinds of services to the user depending on the agreement. For example, for an extra amount, cost setup module 216 may permit proxy faxing services that, for example, receive a facsimile from a sending party and hold the facsimile for delivery to the destination at a unspecified time or multiple destinations specified by the sending party. It should be pointed out that the exact content in the agreement does not affect the operation of the present invention, one of the important features, as will be further appreciated below, is that users are provided the unlimited use of the telephony services for a pre-arranged fee without being measured for the use of the services in terms of seconds or minutes or the distance.

Routing control 218 ensures a connectionless link is provided between a pair of available gateway phones. Typically, routing control 218 includes a list of address identifiers, each identifying one of the gateway phones managed by gatekeeper 200. When the data network is the Internet, the address identifies is typically a Universal Resource Locator (URL) or Universal Resource Identifier (URI), taking a form of, for example, www.service.net/qphone1 or 234.221.128.182. Based on the availability of the gateway phones, an address identifier is retrieved and provided by the gatekeeper to the calling gateway phone so that the link can be established between the calling gateway phone and the gateway phone identified by the address identifier.

Figure 3:
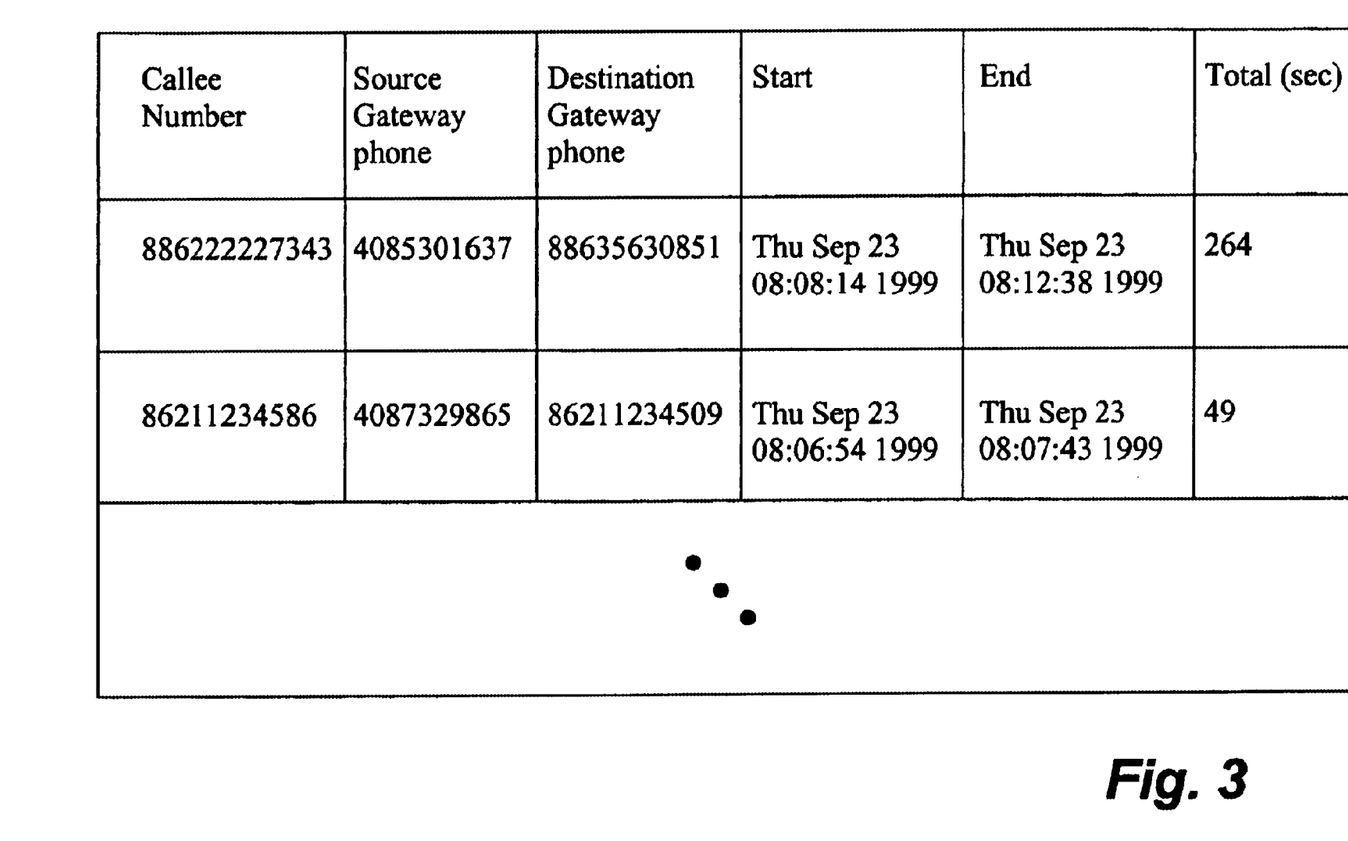
FIG. 3 shows an example of a report in which callee numbers, source and destination gateway phone numbers, when a call starts and ends and the total duration of the call are recorded in a gatekeeper.

Reporting module 224 is provided to monitor the activities of voice communications provided by the gatekeeper. For example, an enterprise desires a monthly report from the service provider for all phone activities for some or all of the phones in the enterprise, reporting module 224 can be configured to record the phone numbers called and the duration. Table in FIG. 3 shows an example of such reporting in which callee number, source and destination gateway phone numbers, when a call starts and ends and the total duration of the call are recorded.

Messaging service 226 is configured to provide messages to a group of designated phones. Reporting module 224 may provide a list of callee numbers that may be contacted automatically by the gatekeeper for message broadcasting or urgent notifications.

As understood by those skilled in the art that not every component shown in FIG. 2A is needed for the present invention to operate. Some may be inactivated or need not implemented, others may be added in modules 228. In accordance with the features in the present invention, none of services provided by the components therein will require the users to pay for to use in terms of the time.

Figure 2B:
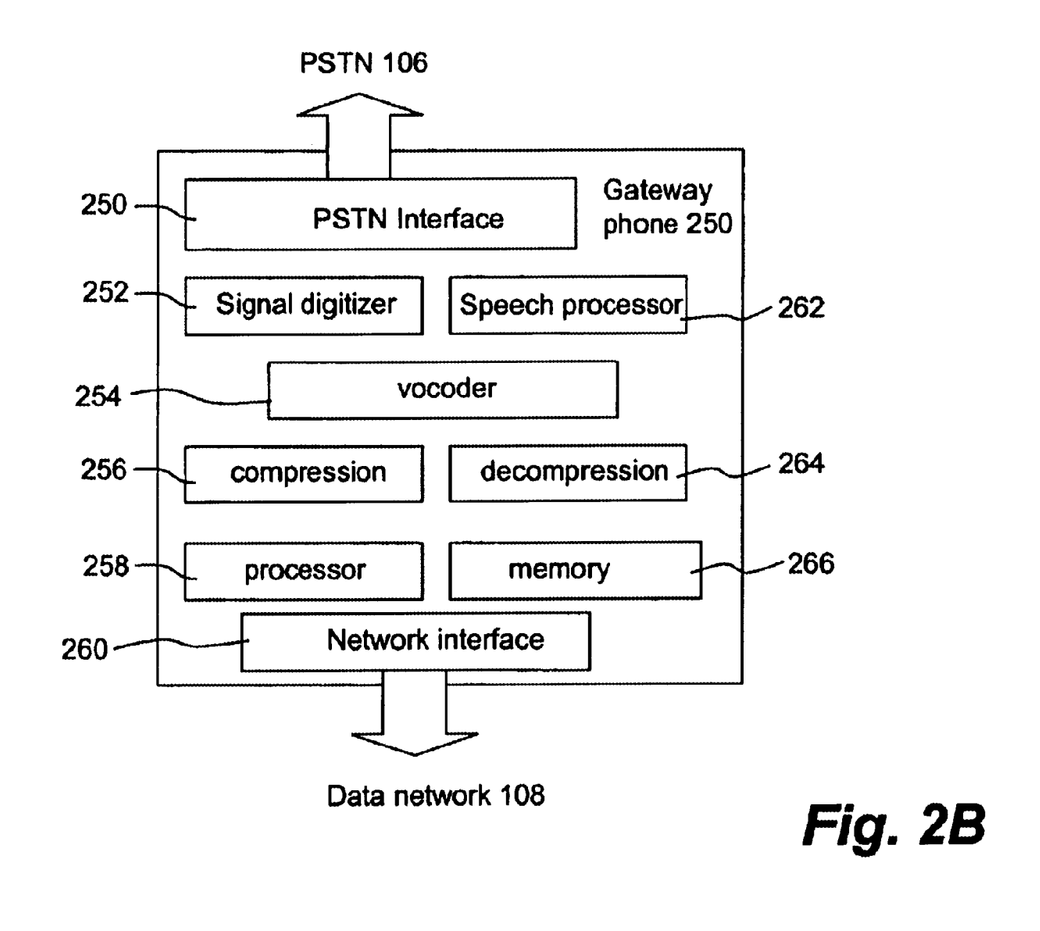
FIG. 2B shows a function block diagram of a gateway phone that may correspond to gatekeeper and generally offered by an IP telephony service provider to a user at no or little cost.

Referring now to FIG. 2B, there is shown a function block diagram of a gateway phone 250 that may correspond to gateway phone 110 or 112 of FIG. 1A, or 123 or 125 of FIG. 1B. Gateway phone 250 comprises a basic phone function as well as a network function. The basic phone function enables gateway phone 250 to function as a regular phone, receiving phone calls (i.e. analog voice signals) from other phones and making phone calls to other phones, all through a PSTN interface 251. The network function allows gateway phone 250 to function as a computing device capable of data communication, through network interface 260, with any data processing devices including gatekeeper 200. To bridge these two functions to work together, signal digitizer 252, speech processor 262, vocoder 254 and compression/decompression 256 provide necessary functions to convert one type of signal to another type of signal. Specifically, analog voice signals coming from PSTN 106 are digitized, encoded and then compressed into data that are appropriate for transporting over data network 108. Likewise, data received from data network 108 are uncompressed, decoded and converted to analog signals that are appropriate for transmitting over PSTN 106. In addition, gateway phone 250 includes a function that can automatically dial a number of a phone to establish a circuit-switched connection with the phone.

The above description of gateway phone 250 makes it evident to those skilled in the art how to implement the circuitry and embedded software to facilitate the functions performed by gateway phone 250.

Figure 4:
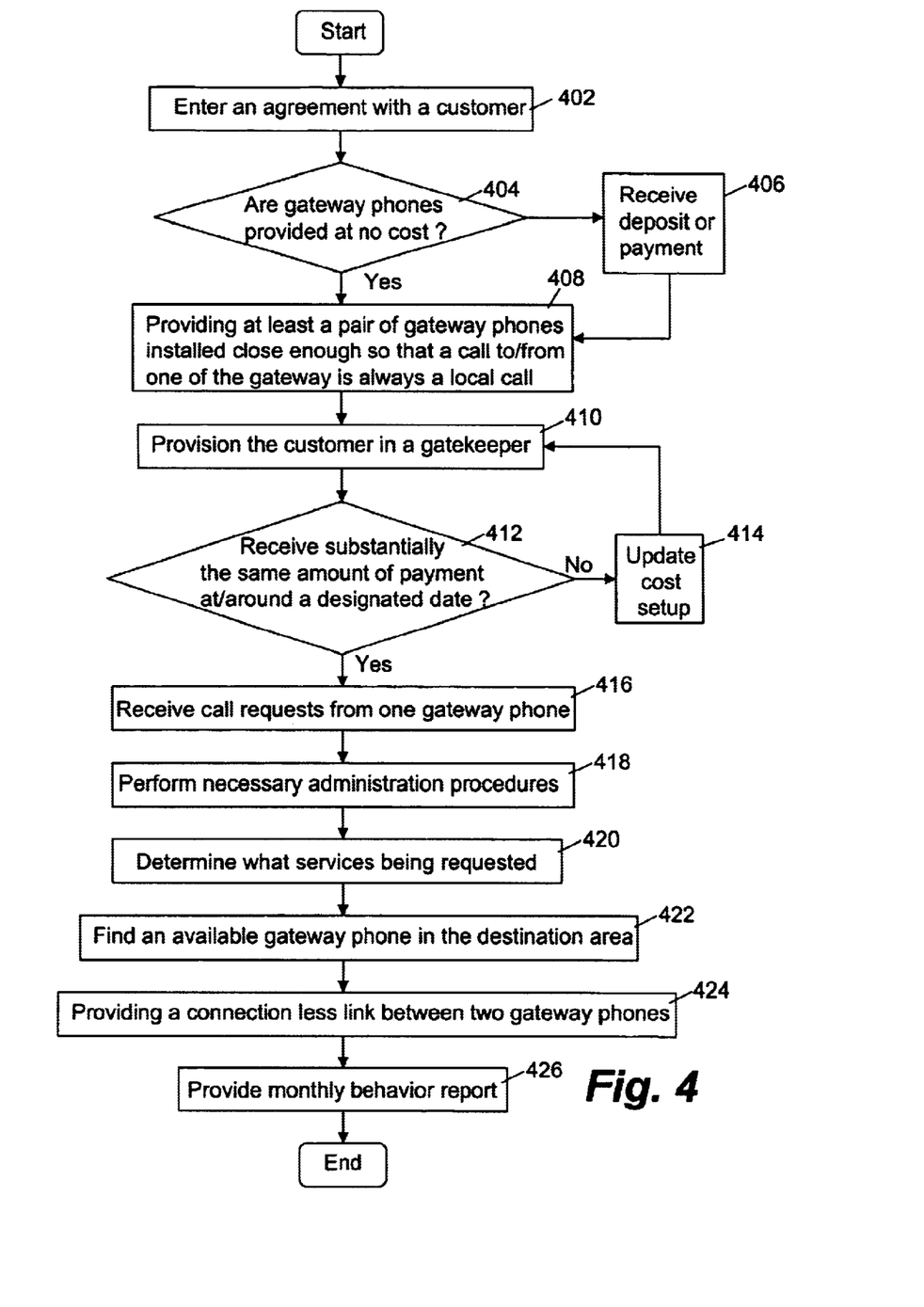
FIG. 4 shows a process flowchart of the present invention according to one embodiment thereof and shall be understood in conjunction with the preceding figures.

To further describe the present invention, FIG. 4 shows a process flowchart 400 according to one embodiment and shall be understood in conjunction with the preceding figures. To provide unlimited telephone services over a data network without regulating the usage thereof, a service provider must enter an agreement with a user. It should be noted that "without regulating" means herein that the services are not billed for in terms of the time. Unlike the traditional phone service carriers, the service provider provides the unlimited use of the telephony services without billing the user for the time the services are actually used.

At 402, a service provider enters an agreement or a service plan with a user. The user may be an individual customer, an international corporation or a local enterprise and preferably a heavy user of long distance and international long distance calls. The agreement includes a commitment from the user that the telephony service will be provided by the service provider for a prearranged period, for example, several months or one or more years and for a predetermined fee. Different from the traditional phone service plans, the predetermined fee is a fixed amount independent from the actual use of the service. Examples of the predetermined fee may include $65.00 a month or $650 a year. Regardless of the exact amount, the predetermined fee will stay the same for a substantially long period, for example 6 months or a year, which guarantees the user of the exact cost for a long time but also allows the service provider to adjust the predetermined fee slightly based on the inflation.

Depending on the implementation preference, the service plan or agreement may or may not include the cost of the gateway phones. Different from the product companies that are entering the business of VoIP by selling equipment, the service provider herein may provide the gateway phones at no or little cost to the user. At 404, it is therefore determined if the service plan includes the cost of the gateway phones. In the situation that the service requires a nominal fee from the user to cover the cost of the gateway, the service provider must receive the fee or an assurance that the fee will be paid at 406. Process 400 moves to 408. If the service plan indicates that the gateway phones are provided at no cost to the user, process 400 moves directly to 408.

At 408, at least a pair of gateway phones is provided for installation in two locations remotely located with respect to each other. For example, an individual customer in San Francisco who makes an enormous number of calls to a location in New York City desires to avoid the regular long distance tolls and signs up with the service provider. In this case, a gateway phone is installed closely enough to the phone in San Francisco and assigned to a phone number and another gateway phone is installed closely enough to the phone in New York City and assigned to another phone number. The installation means herein that, on one side, the gateway phone is installed like a regular phone (i.e. getting help from the local phone company and obtaining a phone number therefore) and, on the other side, it is installed like hooking a computer onto the Internet.

Specifically, the phone in San Francisco has a phone number (415) 555-1111 and the phone in New York City has a phone number (212) 666-2222. The gateway phone servicing the phone (415) 555-1111 in San Francisco obtains a phone number (415) 555-1212 while the gateway phone servicing the phone (212) 666-2222 in New York City obtains a phone number (212) 666-2121. With such arrangement of the installation, a call to/from the phone (415) 555-1111 from/to gateway phone (415) 555-1212 is a local call which may be free of charge. Similarly, a call to/from the phone (212) 666-2222 to/from the gateway phone (212) 666-2121 is a local call as well.

The above description is equally applied when the user is an international corporation that has, for example, a first branch office in Silicon Valley and a second branch office in Taiwan. Each of the branch offices has a number of phones. In this case, a plurality of gateway phones may be installed locally, preferably, in the site of the office. It should be noted that the number of the gateway phones does not have to be the same as the number of the phones in the office. The exact number of the gateways to be installed depends on the busyness of the phones, typically, a gateway may be configured to serve 4 or more phones.

At 410, the user is provisioned in the gatekeeper. The provisioning procedure includes the entry of each of the phone numbers of the gateway phones such that each of the gateway phones has an address identifier associated to the phone number. The provisioning procedure may further include cost setups in accordance with the service plan and other services listed as examples in FIG. 2A.

At 412, the service provider receives the predetermined fee on a regular basis. If the fee does not come in for a certain time, the cost set-up must be updated at 414, which may include a suspension or downgrade of the services or consequently cause a re-provisioning of the user at 410. One of the exemplary reprovisioning procedures is simply to discontinue the service by blocking any call requests from the users. If the fee comes regularly, the services are provided continuously.

In operation, a call request is received from one of the gateway phones from one side. To facilitate the description of the operation, it is assumed that the above individual consumer situation is used. At 416, a call request is received from the gateway phone (415) 555-1212. The call request is generated automatically in the gateway phone when it receives a call from the phone (415) 555-1111. More specifically, a user in San Francisco wants to call the phone in New York City but dials the gateway phone (415) 555-1212 first followed by the phone number (212) 666-2222. According to one implementation, the call request includes both of the numbers (415) 555-1212 and (212) 666-2222. Upon receiving the call request, the gatekeeper looks up for the status of the user account with respect to the gateway phone (415) 555-1212 at 418. The status may indicate if the call request shall be honored or discarded or other reposes may be produced. The status may further indicate what level of data security shall be provided so that the secrecy of a subsequent telephony communication may be protected. At 420, it is additionally to check what service the call request is desirous. For example, the call request may represent a regular phone call or a facsimile.

At 422, the gatekeeper connects the gateway phone (212) 666-2121 or one of a list of the gateway phones to see if it is available for accepting a call. When it is determined that the gateway phone on the callee side is available, the address identifier thereof (according to the phone number (212)

666-2121) is retrieved and a packet-switched link or a connectionless link is established between the gateway phone (415) 555-1212 and the gateway phone (212) 666-2121. Meanwhile the gateway phone (212) 666-2121 is caused to automatically dial the phone number (212) 666-2222. When the phone (212) 666-2222 is getting through, a circuit-switched link with the gateway phone (212) 666-2121 is established. Hence a voice communication link between the phone (212) 666-2222 and the phone (415) 555-1111 is consequently established at 424 and the use of the telephony service is started.

During the service being used, a user behavior report may be generated and include information listed as an example in FIG. 3. The report may be provided to the user for a fee or other arrangement if desired. One of the exemplary use of the report may be for messaging services. As the report includes the callee's phone numbers, a company-wise message may be automatically broadcast to all the phone numbers available per a request from the user.

It can be appreciated by those skilled in the art that the present invention, significantly apart from the prior art systems or service plans, introduces a service plan, that provides users an unlimited use of the telephony services regardless of the distance and times the services are used. It is believed for the first time in the VoIP industry, the present invention provides a service model that truly differentiates from the traditional billing-by-time model or the purchasing equipment model and offers a profound opportunity to populate the VoIP services among consumers and businesses.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

What is claimed is:

1. A method for providing a telephony service between a first party and a second party through a data network, the method comprising:

providing a pair of gateway phones, a first one assigned to a first phone number and a second one assigned to a second phone number, both of the gateway phones coupled between a telephone network and the data network, but the first one installed closely enough to the first party and the second one installed close enough to the second party so that either one of the two parties can make a local call to the respective gateway phone thereof;

provisioning the telephony service by storing respectively the first and second phone numbers of the gateway phones in a gatekeeper server coupled to the data network after a contract relationship is established with either one of the two parties, wherein the gatekeeper server includes an account manager configured to control the telephony service and a predetermined service level in accordance with the contract relationship;

establishing a connectionless link over the data network between the two gateway phones when receiving a calling request from the first gateway phone, only after the account manager determines that the contract relationship is still in good standing, wherein the calling request is generated automatically in the first gateway phone when the first party dials the first phone number followed by a phone number of the second party, the calling request including the first phone number of the first gateway phones and the phone number of the second party; and causing the second gateway phone device to connect to the second party after the gatekeeper server retrieves an address identifier identifying the second gateway phone associated with the second phone number of the second gateway phone so that the telephony service can be provided between the first and second parties.

2. The method as recited in claim 1, wherein the contract relationship is a financial commitment from the either one of the two parties, the financial commitment keeping the account manager in the gatekeeper server to provide the connectionless link.

3. The method as recited in claim 2, wherein the commitment includes a monthly payment from the either one of the two parties.

4. The method as recited in claim 3, wherein the monthly payment is a constant number for a substantially long period regardless how long collectively the connectionless link is established.

5. The method as recited in claim 4, wherein the account manager is updated whenever the monthly payment is received or not received, when the monthly payment is received, the account manager continues to facilitate the telephony service for either one of the two parties, when the monthly payment is received, the account manager disrupts the telephony service even if the calling request is still received from either one of the first gateway phone or the second gateway phone.

6. The method as recited in claim 1, wherein the data network is the Internet, the telephone network is the Public Switch Telephone Network (PSTN) and the calling request is an Internet protocol request.

7. The method as recited in claim 1, wherein the gatekeeper further includes a cost setup module configured to work with the account manager to provide different levels or kinds of services in accordance with the contract relationship.

8. The method as recited in claim 7, wherein the first party and the second party are within an enterprise.

9. The method as recited in claim 1, wherein the establishing a connectionless link over the data network comprises:

receiving the calling request from the first gateway phone;

retrieving the second phone number of the second gateway phone from the calling request; and verifying if the contract relationship is updated to continue the telephony server.

10. The method as recited in claim 9, wherein the establishing a connectionless link over the data network further comprises:

archiving information related to activities of the first and second gateway phones, the information including the phone number of the second party, the first and second phone numbers of both of the gateway phones.

11. A method for providing a telephony service through a data network to an entity that has a first location and a second location, the two locations remotely located with respect to each other and each having a number of telephonic devices, the method comprising:

entering a service plan with the entity, the service plan including a periodic payment from the entity, wherein the periodic payment stays unchanged for a substantial long period;

providing a first group of gateway phones installed closely enough to the first location, each of the first group of gateway phones assigned to a first number and coupled between the data network and a first telephone network so that any of the telephonic devices of the first location just needs to make a local call to be connected to one of the first group of gateway phones;

providing a second group of gateway phones installed closely enough to the second location, each of the second group of gateway phones assigned to a second number and coupled between the data network and a second telephone network so that any of the telephonic devices of the second location just needs to make a local call to be connected to one of the second group of gateway phones;

provisioning the entity by storing the first number of each of the first group of gateway phones and the second number of each of the second group of gateway phones in a gatekeeper server coupled to the data network, wherein the gatekeeper includes an account manager configured to control the telephony service and a predetermined service level in accordance with the service plan, the account manager accessing, via an account interface, a user database including a plurality of user accounts respectively signed for the telephony service;

establishing a connectionless link over the data network between one of the first group of gateway phones and one of the second group of gateway phones upon receiving a calling request from the one of the first group of gateway phones only after the account manager determines that the service plan is still in good standing, the calling request being generated therein when one of the telephonic devices of the first location dials the first number of the one of the first group of gateway phones, the calling request including the first number of the one of the first group of gateway phones and a phone number of the one of the telephonic devices of the second location; and wherein one of the second group of gateway phones automatically dials the phone number of the one of the telephonic devices of the second location so that the telephony service can be provided between the one of the telephonic devices of the first location and the one of the telephonic devices of the second location.

12. The method as recited in claim 11, wherein the first telephone network and the second telephone network is part of a circuit-switched network.

13. The method as recited in claim 12, wherein the circuit-switched network is the Public Switch Telephone Network (PSTN).

14. The method as recited in claim 13, wherein a connection between the first telephone network and the second telephone network over the circuit-switched network incurs a long distant toll and avoids the long distant toll when the connection is made through the connectionless link over the data network between one of the first group of gateway phones and one of the second group of gateway phones.

15. The method as recited in claim 11, wherein one or more of the telephonic devices are selected from a group consisting of a landline telephone set, a wireless telephone and a facsimile machine.

16. The method as recited in claim 11, wherein the provisioning of the entity comprises activating a reporting mechanism to record activities of each of the first and second group of gateway phones such that an activity report can be provided whenever there is a request for the activity report.

17. The method as recited in claim 11, wherein the establishing of the connectionless link comprises choosing one of the second group of gateway phones that is available for the connectionless link over the data network with the one of the first group of gateway phones.

18. A method for providing a telephony service through a data network to an entity that has a first location and a second location, the two locations remotely located with respect to each other and each having a number of telephonic devices, the method comprising:

keeping a user account in a gatekeeper coupled to the data network, the user account associated with the entity and including information related to the telephony service offered to the entity, the user account further including a plurality of address identifiers, each identifying one of gateway phones installed respectively in the first and second locations and coupled between the data network and a respective local telephone network, wherein each of the gateway phones has a number that any of the telephonic devices can dial for a local circuit-switched connection over the local telephone network;

receiving a payment from the entity, the payment coming periodically and keeping the user account active in the gatekeeper, further the payment being a constant amount in accordance with a service plan entered with the entity, wherein the service plan requires no purchase of any equipment neither regulates the use of the telephony service by the entity;

providing a packet-switched connection between one of the gateway phones in the first location and one of the gateway phones in the second location when the gatekeeper receives a request from the gateway phone in the first location and only after the user account is in good standing and consulted with respect to the address identifier of the gateway phone in the first location, wherein the request comprises the address identifier of the gateway phone in the first location and a phone number of one of the telephonic devices in the second location; and causing one of the gateway phones in the second location to automatically dial the phone number of the telephonic device in the second location; and wherein the telephony service is provided between the telephonic device in the first and the telephonic device in the second locations over the data network and the respective local telephone network.

19. The method as recited in claim 18, wherein one or more of the telephonic devices in either one of the first and second locations is one of (i) a wireless telephone, (ii) a landline telephone and (iii) a facsimile machine.

20. A system for providing a telephony service through a data network to an entity that has a first location and a second location, the two locations remotely located with respect to each other and each having a number of telephonic devices, the system comprising:

a gatekeeper coupled to the data network and maintaining a user account associated with the entity and including information related to the telephony service offered to the entity in accordance with a service plan that requires no purchase of any equipment neither regulates the use of the telephony service by the entity;

a first group of gateway phones, coupled between a first local telephone network and the data network, installed substantially close to the first location so that any of the telephonic devices in the first location just needs to make a local call to any one of the first group of gateway phones for a circuit-switched connection;

a second group of gateway phones, coupled between a second local telephone network and the data network, installed substantially close to the second location so that any of the telephonic devices in the second location just needs to make a local call to any one of the second group of gateway phones for a circuit-switched connection; and wherein the gatekeeper causes a packet-switched connection established between one of the gateway phones in the first group and one of the gateway phones in the second group when a request is received from each one of the gateway phones in the first and second groups and only after the user account is still in good standing in accordance with the service plan.

21. The system as recited in claim 20, wherein the telephony service provided between the first location and the second location is through the packet-switched connection so that no tolls would be incurred.

22. The system as recited in claim 20, wherein the service plan ensures the entity a fixed cost for a substantial long period regardless how long the telephony service is used by the entity.

* * * * *